United States Patent
Lee et al.

(10) Patent No.: US 9,232,520 B2
(45) Date of Patent: Jan. 5, 2016

(54) MACHINE TYPE COMMUNICATION SUPPORT METHOD AND APPARATUS

(71) Applicant: Electronics and Telecommunications Research Institute, Daejeon (KR)

(72) Inventors: Moon Sik Lee, Daejeon (KR); Jun Hwan Lee, Seoul (KR); Il Gyu Kim, Chungbuk (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 13/679,139

(22) Filed: Nov. 16, 2012

(65) Prior Publication Data

US 2013/0121317 A1 May 16, 2013

(30) Foreign Application Priority Data

Nov. 16, 2011 (KR) .................. 10-2011-0119631
Nov. 13, 2012 (KR) .................. 10-2012-0128078

(51) Int. Cl.
| | |
|---|---|
| H04W 4/00 | (2009.01) |
| H04W 72/00 | (2009.01) |
| H04W 72/04 | (2009.01) |
| H04J 3/00 | (2006.01) |
| H04L 5/00 | (2006.01) |
| H04L 25/02 | (2006.01) |
| H04L 27/26 | (2006.01) |

(52) U.S. Cl.
CPC .............. *H04W 72/0446* (2013.01); *H04J 3/00* (2013.01); *H04L 5/0042* (2013.01); *H04L 5/0053* (2013.01); *H04L 5/0094* (2013.01); *H04L 25/0238* (2013.01); *H04W 72/044* (2013.01); *H04L 27/2601* (2013.01)

(58) Field of Classification Search
None
See application file for complete search history.

(56) References Cited

U.S. PATENT DOCUMENTS

2009/0022235 A1    1/2009   Zhang et al.
2012/0064932 A1*  3/2012   Lim et al. .................. 455/509
(Continued)

FOREIGN PATENT DOCUMENTS

KR    1020110072063    6/2011
KR    1020110101086    9/2011

OTHER PUBLICATIONS

TR 102 691, "Machine-to-Machine communications (M2M); Smart Metering Use Cases", May 2010, ETSI, all pages.*
(Continued)

*Primary Examiner* — Kwang B Yao
*Assistant Examiner* — Adam Duda
(74) *Attorney, Agent, or Firm* — Nelson Mullins Riley & Scarborough LLP

(57) ABSTRACT

Provided are a machine type communication (MTC) support method and apparatus capable of providing efficient MTC service. First, when a base station transmits a subframe to which an MTC-physical control format indicator channel (PCFICH) is allocated using an MTC-PCFICH code that is cyclic-shifted on the basis of a control format indicator (CFI) to MTC user equipment (UE), the MTC UE detects the MTC-PCFICH from the received subframe by performing blind decoding of a cyclic shift, and detects a region occupied by a legacy physical downlink control channel (PDCCH) on the basis of the detected MTC-PCFICH. Accordingly, it is possible to support efficient MTC service in a Third Generation Partnership Project (3GPP) Long Term Evolution (LTE)-based mobile communication system while maintaining compatibility with a legacy LTE station.

16 Claims, 6 Drawing Sheets

(56) References Cited

U.S. PATENT DOCUMENTS

2012/0287885 A1* 11/2012 Dai .............................. 370/329
2013/0148607 A1* 6/2013 Yu et al. ........................ 370/329

OTHER PUBLICATIONS

RP-100330, "RAN Improvements for Machine-type Communications", Mar. 2010, 3GPP, all pages.*
Anritsu, "LTE Resource Guide", Jan. 2010, web.cecs.pds.edu/~fli/class, all pages.*
Chen, "Machine-to-Machine communication in LTE-A", 2010, IEEE, all pages.*
Telesystem Innovations, "LTE in a Nutshell; The Physical Layer", 2010, Telesystem Innovations, all pages.*
Lenz, "M2M Comunication—Next Revolution on Wireless Interaction", Jun. 2008, ETSI, all pages.*
Unknown, "Separated Contention Scheme for Supporting Machine-to-Machine (M2M) Transportaiton Service over LTE Communication System", 2010, http://thesis.lib.ncu.edu.tw/, all pages.*

* cited by examiner

MACHINE TYPE COMMUNICATION SUPPORT METHOD AND APPARATUS

CLAIM FOR PRIORITY

This application claims priority to Korean Patent Application No. 10-2011-0119631 filed on Nov. 16, 2011 and No. 10-2012-0128078 filed on Nov. 13, 2012 in the Korean Intellectual Property Office (KIPO), the entire contents of which are hereby incorporated by reference.

BACKGROUND

1. Technical Field

Example embodiments of the present invention relate in general to support of machine type communication (MTC), and more particularly, to an MTC support method and apparatus capable of providing efficient MTC user equipment (UE) service in a Third Generation Partnership Project (3GPP) Long Term Evolution (LTE)-based mobile communication system.

2. Related Art

MTC or machine-to-machine (M2M) communication is a form of data communication which involves one or more entities that do not necessarily require human interaction.

Service optimized for MTC differs from service optimized for human-to-human (H2H) communication. In comparison with current mobile network communication service, service optimized for MTC can be characterized by a) several market scenarios, b) data communications, c) lower cost and less effort, d) a much larger number of communicating stations, e) a wider service area, f) very low traffic per station, and so on.

MTC may appear in a variety of service forms, such as smart metering, tracking and tracing, remote maintenance and control, and eHealth.

In current 3GPP, MTC standardization is under way using the term "machine-to-machine (M2M) communication."

In the present invention, a station that supports LTE or LTE-Advanced conforming to the 3GPP standard Rel-Aug. 9, 2010 is referred to as a legacy LTE station to be distinguished from MTC UE discussed in the present invention.

In Rel-Aug. 9, 2010, legacy LTE stations are defined to support a transmission/reception bandwidth of up to 20 MHz. MTC UE is intended for low cost and support of a low transmission rate, and thus can have a smaller bandwidth than a system bandwidth of a base station.

In Rel-Aug. 9, 2010, a physical broadcast channel (PBCH) through which synchronization signals, that is, a primary synchronization signal (PSS) and a secondary synchronization signal (SSS), and system information are transmitted, is transmitted with a bandwidth of 1.08 MHz with reference to a center frequency of a system bandwidth.

Here, 1.08 MHz is the same as a bandwidth obtained by excluding guard bands on both sides from 1.4 MHz that is the minimum system bandwidth. Thus, MTC UE can receive a PSS/SSS/PBCH even in a narrower bandwidth than a system bandwidth of a base station.

However, since a legacy physical downlink control channel (PDCCH) that is a control channel, a physical control format indicator channel (PCFICH) through which the number of orthogonal frequency division multiplexing (OFDM) symbols occupied by the legacy PDCCH is transmitted, and a physical hybrid automatic repeat request (HARQ) indicator channel (PHICH) through which ACK/NACK information about a physical uplink shared channel (PUSCH) is transmitted, are transmitted over an entire system bandwidth, MTC UE that has a narrower bandwidth than a system bandwidth of a base station cannot accurately receive these channels.

SUMMARY

Accordingly, example embodiments of the present invention are provided to substantially obviate one or more problems due to limitations and disadvantages of the related art.

Example embodiments of the present invention provide a machine type communication (MTC) support method capable of providing efficient MTC service.

Example embodiments of the present invention also provide an apparatus performing the MTC support method.

In some example embodiments, an MTC support method performed in a base station includes: allocating physical channels of MTC user equipment (UE) including information about the number of orthogonal frequency division multiplexing (OFDM) symbols occupied by a physical downlink control channel (PDCCH) of a station, to a physical downlink shared channel (PDSCH) region between the base station and the station to transmit data to the MTC UE; and transmitting, at the physical channels of the MTC UE, an allocated subframe.

In other example embodiments, an MTC support method performed in MTC UE includes: receiving a subframe from a base station; and detecting a region occupied by a PDCCH of a station from the received subframe.

In other example embodiments, a base station performing an MTC support method includes: a frame configuration unit configured to allocate physical channels of MTC UE to a PDSCH region between the base station and a station to transmit data to the MTC UE; and a communicator configured to transmit a subframe to which the physical channels of the MTC UE are allocated.

In other example embodiments, MTC UE performing an MTC support method includes: a transceiver configured to receive a subframe from a base station; and a controller configured to detect a region occupied by a PDCCH of a station from the received subframe.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
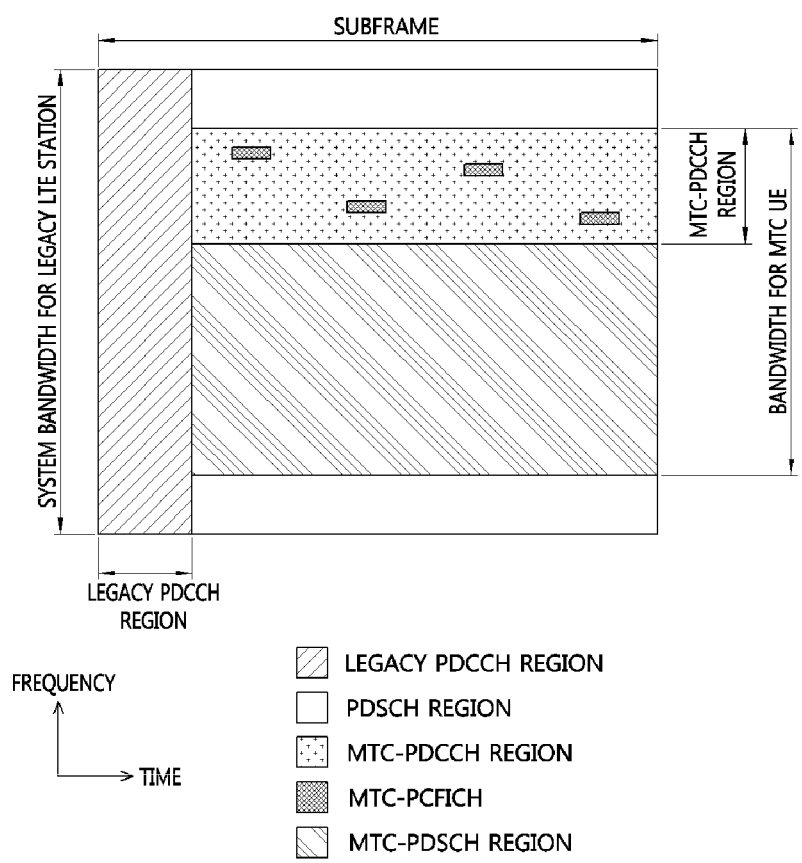
FIG. 1 illustrates a frame structure relating to machine type communication (MTC)-physical control format indicator channel (PCFICH) allocation according to an example embodiment of the present invention.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in detail with reference to the accompanying drawings. To facilitate overall understanding of the present invention, like numbers refer to like elements throughout the drawings, and the description of the same component will not be reiterated.

Terms used herein will be defined. First, names of physical downlink channels specified in a Third Generation Partnership Project (3GPP) Long Term Evolution (LTE)-based wireless transmission standard for a legacy LTE station are as follows:

Physical downlink shared channel (PDSCH): a physical downlink channel through which data for the legacy LTE station is transmitted Legacy physical downlink control channel (PDCCH): a physical channel through which control information for demodulation of a PDSCH is transmitted Physical control format indicator channel (PCFICH): a physical channel through which the number of orthogonal frequency division multiplexing (OFDM) symbols occupied by a legacy PDCCH is transmitted Physical hybrid automatic repeat request (HARQ) indicator channel (PHICH): a physical channel through which ACK/NACK information about a physical uplink shared channel (PUSCH) is transmitted In addition, names of physical downlink channels for MTC user equipment (UE) herein are defined as follows:

MTC-PDSCH: a physical channel through which MTC downlink data is transmitted

MTC-PDCCH: a physical channel through which control information for demodulation of an MTC-PDSCH is transmitted MTC-PCFICH: a physical channel through which the number of OFDM symbols occupied by an MTC PDCCH in the time domain, the number of resource blocks (RBs) or the number of subcarriers occupied by the MTC PDCCH in the frequency domain, or the number of groups consisting of some RBs or some subcarriers and occupied by the MTC PDCCH, is transmitted MTC-PHICH: a physical channel through which ACK/NACK information about an MTC PUSCH is transmitted In this specification, example embodiments of the present invention are described, focusing on resource allocation for data exchange between a base station and MTC UE.

Here, a base station denotes a terminal node of a network that performs direct communication with MTC UE. A specific operation described as being performed by a base station may be performed by an upper node of the base station in some cases.

In other words, in a network consisting of a plurality of network nodes including a base station, various operations performed for communication with a station may be performed by the base station or network nodes other than the base station.

The term "base station" used herein may be replaced with another term such as fixed station, Node-B, evolved Node-B (eNB), or access point. Also, the term "station" used herein may be replaced with another term such as UE, subscriber station (SS), mobile subscriber station (MSS), or mobile terminal (MT).

While a transmission end denotes a node that transmits data or voice service, a reception end denotes a node that receives the data or voice service. Thus, in an uplink, a station may be a transmission end, and a base station may be a reception end. Likewise, in a downlink, the station may be a reception end, and the base station may be a transmission end.

Meanwhile, a personal digital assistant (PDA), a cellular phone, a personal communication service (PCS) phone, a global system for mobile (GSM) phone, a wideband code division multiple access (CDMA) phone, a mobile broadband system (MBS) phone, etc. can be used as MTC UE and a legacy LTE station of the present invention.

Example embodiments of the present invention can be implemented by a variety of means. For example, example embodiments of the present invention can be implemented by hardware, firmware, software, or a combination thereof.

In the case of implementation by hardware, a method according to example embodiments of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and so on.

In the case of implementation by firmware or software, a method according to example embodiments of the present invention can be implemented in the form of modules, procedures, functions, etc. for performing the above-described functions or operations. A software code can be stored in a memory unit and executed by a processor. The memory unit may be present in or outside the processor, and exchange data with the processor by a variety of known means.

FIG. 1 illustrates a frame structure relating to MTC-PCFICH allocation according to an example embodiment of the present invention.

Referring to FIG. 1, a specific section of a subframe corresponds to a legacy PDCCH used for a base station to transmit control information to a legacy LTE station.

Here, a legacy PDCCH may consist of one to three symbols, or may consist of three or more symbols.

A base station may allocate an MTC-PDCCH, MTC-PDSCH, and MTC-PCFICH for MTC UE to a PDSCH region of a subframe excluding a legacy PDCCH section.

Here, MTC-PCFICH symbols may be frequency-hopped to different frequency resources within an MTC-PDCCH region to obtain a frequency diversity effect. Meanwhile, a frequency hopping pattern may vary according to subframes or slots. Also, according to another embodiment of the present invention, MTC-PCFICH symbols may be allocated to the same frequency band without frequency hopping.

Figure 2:
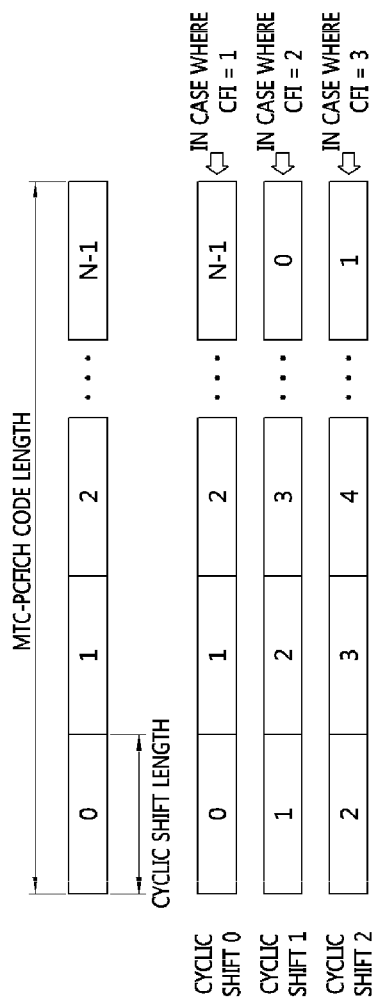
FIG. 2 illustrates a frame structure relating to allocation of resource regions occupied by an MTC-physical downlink control channel (PDCCH) and a legacy PDCCH according to an example embodiment of the present invention.

FIG. 2 illustrates a frame structure relating to allocation of resource regions occupied by an MTC-PDCCH and a legacy PDCCH according to an example embodiment of the present invention.

Referring to FIG. 2, when an MTC-PCFICH code including information about the number of OFDM symbols occupied by an MTC-PDCCH (time domain), or the number of RBs/subcarriers/groups occupied by the MTC-PDCCH (frequency domain) is given, a base station allocates an MTC-PCFICH using an MTC-PCFICH code that is obtained by cyclic-shifting the given MTC-PCFICH according to a control format indicator (CFI) that is information about the number of OFDM symbols occupied by a legacy PDCCH.

Here, a cyclic shift method may include shifting of the PCFICH code in a direction toward the least significant bit (LSB) as well as shifting of PCFICH code in a direction toward the most significant bit (MSB) as shown in FIG. 2. The length of cyclic-shifted symbols or bits may be fixed or may vary according to CFIs.

Here, a CFI is information that has a length of two bits and denotes the number of OFDM symbols at which a legacy PDCCH is present in the corresponding subframe. Also, an MTC CFI is information such as the number of OFDM symbols in the time domain occupied by an MTC-PDCCH transmitted by an MTC-PCFICH, the number of RBs, the number of subcarriers, and the number of groups of RBs and subcarriers in the frequency domain occupied by the MTC-PDCCH, and so on.

In a method for supporting MTC according to an example embodiment of the present invention, it has been described that, using an implicit scheme, a base station cyclic-shifts a previously given MTC-PCFICH code according to a CFI for a legacy LTE station, and allocates an MTC-PCFICH. However, in another example embodiment of the present invention, using an explicit scheme, CFI information bits for a legacy LTE station may be sent on a control channel (e.g., an MTC-PCFICH) for MTC UE determined in advance between a base station and MTC UE.

Here, to perform the explicit scheme, the base station may perform joint coding of CFI information for a legacy LTE station and CFI (MTC-CFI) information for MTC UE, and send the joint-coded CFI information on the control channel for MTC UE.

Specifically, since the legacy LTE station has three CFIs of 1, 2 and 3, when the MTC UE has N MTC CFIs, the base station is in need of a new codeword table of 3×N CFI codewords (e.g., when MTC CFIs have three values of 1, 2 and 3, a CFI codeword table of nine CFIs is necessary).

Meanwhile, when a base station performs resource allocation for MTC UE in the implicit scheme between the aforementioned schemes, the MTC UE should know the number of OFDM symbols occupied by a legacy PDCCH. A method in which MTC UE detects the number of OFDM symbols occupied by a legacy PDCCH (i.e., positions of OFDM symbols at which MTC physical channels are started in a subframe) will be described below.

Figure 3:
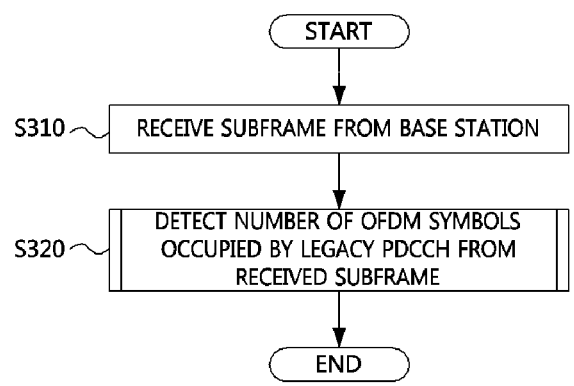
FIG. 3 is a flowchart illustrating a process of detecting the number of orthogonal frequency division multiplexing (OFDM) symbols occupied by a legacy PDCCH according to an example embodiment of the present invention.

FIG. 3 is a flowchart illustrating a process of detecting the number of OFDM symbols occupied by a legacy PDCCH according to an example embodiment of the present invention.

Referring to FIG. 3, MTC UE receives a subframe of a downlink channel from a base station (S310).

Subsequently, the MTC UE detects the number of OFDM symbols occupied by a legacy PDCCH from the received subframe (S320).

By detecting the number of OFDM symbols occupied by the legacy PDCCH in step 320, the MTC UE can find positions of OFDM symbols at which physical channels for the MTC UE are started.

A detailed method of performing step 320 will be described below.

Figure 4:
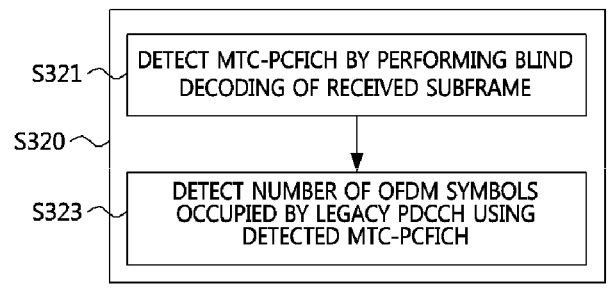
FIG. 4 is a flowchart illustrating in detail a step of detecting the number of OFDM symbols occupied by a legacy PDCCH in FIG. 3.

FIG. 4 is a flowchart illustrating in detail the step of detecting the number of OFDM symbols occupied by the legacy PDCCH in FIG. 3.

Referring to FIG. 4, the MTC UE performs blind decoding of the subframe received from the base station, thereby detecting an MTC-PCFICH (S321).

The MTC UE detects the number of OFDM symbols occupied by the legacy PDCCH using the MTC-PCFICH detected in step 321 (S323).

For example, when a position of the MTC-PCFICH is allocated to the last OFDM symbol of the subframe, the MTC UE detects an MTC-PCFICH by performing blind decoding of a cyclic shift.

Here, the MTC-PCFICH is assumed as being allocated using an MTC-PCFICH code that is obtained by cyclic-shifting a given predetermined MTC-PCFICH code on the basis of a CFI for a legacy LTE station.

The MTC UE may determine the number of OFDM symbols occupied by the legacy PDCCH and the number of OFDM symbols occupied by an MTC-PDCCH on the basis of the detected MTC-PCFICH.

Figure 5:
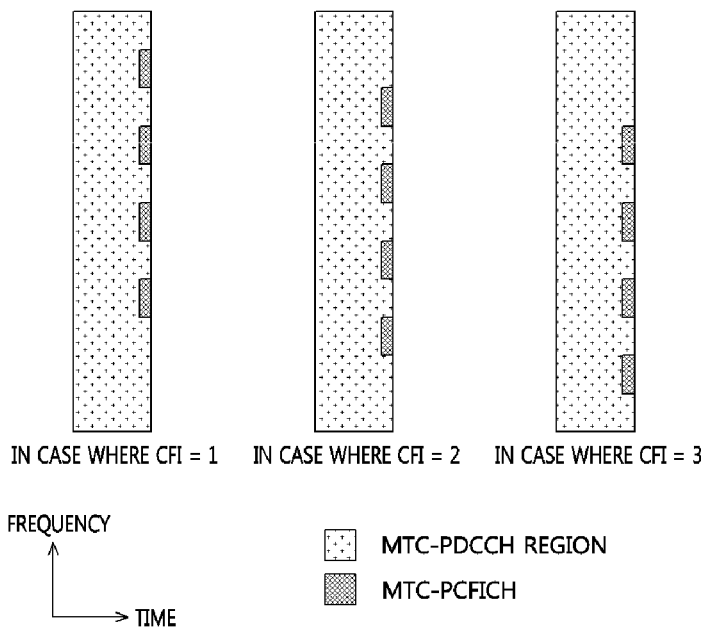
FIG. 5 is a conceptual diagram of positions of MTC-PCFICH symbols allocated differently in the frequency domain according to control format indicators (CFIs)

In addition, referring to FIG. 5, the MTC UE may detect the number of OFDM symbols occupied by the legacy PDCCH on the basis of symbol positions of the detected MTC-PCFICH that are allocated in the frequency domain differently according to CFIs. For example, when it is determined that a CFI is 1 according to the positions of the MTC-PCFICH symbols, the MTC UE may determine that the number of OFDM symbols occupied by the legacy PDCCH is one.

Alternatively, when an MTC-PDCCH region and an MTC-PDSCH region are separated by frequency division multiplexing (FDM), the MTC UE detects an MTC-PCFICH by performing blind decoding of a cyclic shift.

Here, the MTC-PCFICH is assumed as being obtained by cyclic-shifting a predetermined MTC-PCFICH code on the basis of a CFI for the legacy LTE station.

The MTC UE may determine the number of OFDM symbols occupied by the legacy PDCCH and the number of OFDM symbols occupied by the MTC-PDCCH on the basis of the detected MTC-PCFICH.

Figure 6:
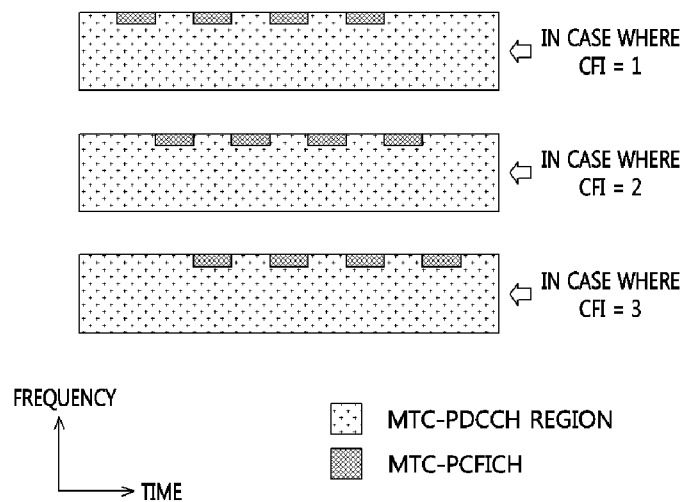
FIG. 6 is a conceptual diagram of positions of MTC-PCFICH symbols allocated differently in the time domain according to CFIs.

Furthermore, referring to FIG. 6, the MTC UE may detect the number of OFDM symbols occupied by the legacy PDCCH on the basis of symbol positions of the detected MTC-PCFICH that are allocated differently in the time domain according to CFIs. For example, when it is determined that a CFI is 1 according to the positions of the MTC-PCFICH symbols, the MTC UE determines that the number of OFDM symbols occupied by the legacy PDCCH is one.

Alternatively, when the position of the MTC-PCFICH is allocated to an OFDM symbol next to the last OFDM symbol occupied by the PDCCH for the legacy LTE station, the MTC UE detects an MTC-PCFICH by performing blind decoding beginning with a specific OFDM symbol (e.g., a first OFDM symbol of the subframe).

Figure 7:
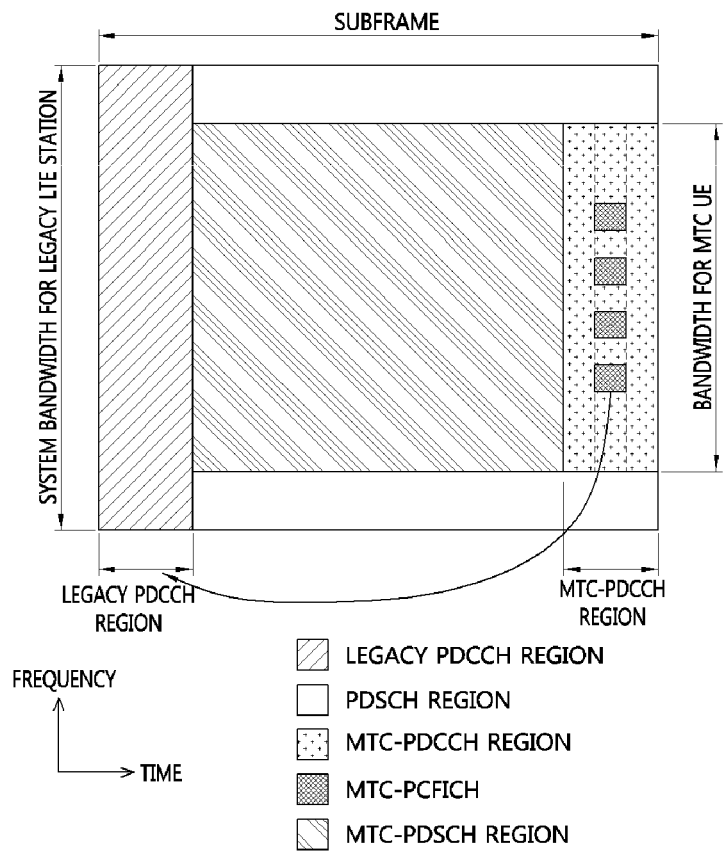
FIG. 7 is a conceptual diagram illustrating determination of a region occupied by a legacy PDCCH according to positions at which MTC-PCFICH symbols are detected.

Alternatively, when an MTC-PDCCH region and an MTC-PDSCH region are separated by time division multiplexing (TDM), the MTC UE detects an MTC-PCFICH by performing blind decoding beginning with the last symbol of the subframe. Referring to FIG. 7, when an MTC-PCFICH is detected by performing blind decoding beginning with the second-to-last symbol, the MTC UE determines that the number of OFDM symbols occupied by the legacy PDCCH is two.

Meanwhile, when an MTC-PDCCH region occupies OFDM symbols beginning with an OFDM symbol next to the last OFDM symbol occupied by the PDCCH for a legacy LTE station, a fourth OFDM symbol of subframe 0 becomes the last OFDM symbol that can be used for an MTC-PDCCH in the MTC-PDCCH region due to use of a synchronization signal (primary synchronization signal (PSS)/secondary synchronization signal (SSS)).

For example, when a CFI is 2, if the number of RBs is greater than 10, an MTC-CFI only has a value of 1 or 2 (i.e., the MTC-PDCCH region occupies only one or two OFDM symbols), and if the number of RBs is equal to or smaller than 10, the MTC-PDCCH region occupies only one OFDM symbol.

Here, MTC-PCFICH symbols allocated to respective OFDM symbols may be allocated in units of two or multiples of two adjacent subcarriers (symbols) for transmission diversity application. Also, the MTC-PCFICH symbols allocated to the respective OFDM symbols may be transmitted over an entire frequency band or an entire time band in the MTC-PDCCH region in units of adjacent subcarriers, to obtain a frequency diversity effect or a time diversity effect in the frequency domain or the time domain.

With reference to FIG. 4 to FIG. 7, the implicit scheme in which MTC UE detects CFI information by performing blind decoding when a base station allocates an MTC-PCFICH using an MTC-PCFICH code cyclic-shifted on the basis of the CFI information denoting the number of PDCCH symbols for a legacy LTE station, has been described.

The explicit scheme in which MTC UE does not need to perform blind decoding according to the other example embodiment of the present invention will be described below.

Figure 8:
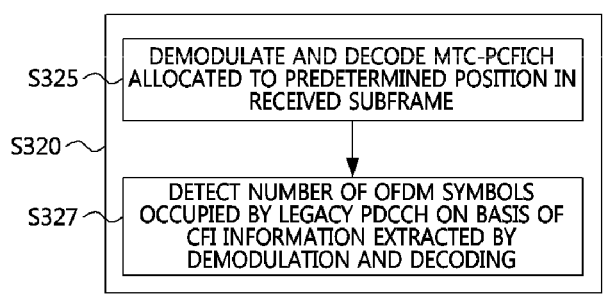
FIG. 8 is a flowchart illustrating a process in which MTC user equipment (UE) determines the number of symbols occupied by a legacy PDCCH in an explicit scheme according to another example embodiment of the present invention.

FIG. 8 is a flowchart illustrating a process in which MTC UE determines the number of symbols occupied by a legacy PDCCH using the explicit scheme according to the other example embodiment of the present invention.

Referring to FIG. 8, MTC UE demodulates and decodes a control channel for MTC UE allocated to a predetermined position in a subframe received from a base station, thereby extracting CFI information bits for a legacy station (S325).

Here, the control channel for MTC UE is transmitted at a fixed position (OFDM symbol position) in the subframe regardless of the number of PDCCH symbols (CFI value) for the legacy LTE station. Thus, it is necessary only to demodulate and decode the control channel for MTC UE transmitted at the fixed position in the subframe, and the MTC UE may not perform blind decoding.

Subsequently, the MTC UE determines the number of OFDM symbols occupied by a legacy PDCCH on the basis of the CFI information bits for the legacy LTE station extracted in step 325 (S327).

Here, using a CFI codeword table, the MTC UE may know the number of OFDM symbols occupied by the legacy PDCCH as well as the number of OFDM symbols occupied by an MTC-PDCCH.

Specifically, since the legacy LTE station has three CFIs of 1, 2 and 3, when the MTC UE has N MTC CFIs, a new codeword table of 3×N CFI codewords is used (e.g., when MTC CFIs have three values of 1, 2 and 3, a CFI codeword table of nine CFIs is used).

Thus, on the basis of a CFI included in MTC-PCFICH information, the MTC UE may determine the number of OFDM symbols occupied by the MTC-PDCCH and the number of OFDM symbols occupied by the legacy PDCCH.

Figure 9:
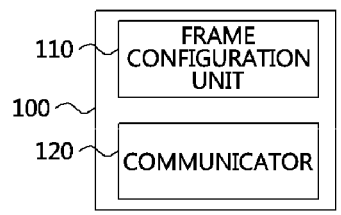
FIG. 9 is a block diagram showing the constitution of a base station for supporting MTC according to an example embodiment of the present invention.

FIG. 9 is a block diagram showing the constitution of a base station for supporting MTC according to an example embodiment of the present invention.

Referring to FIG. 9, a base station 100 for supporting MTC according to an example embodiment of the present invention may include a frame configuration unit 110 and a communicator 120.

The frame configuration unit 110 may allocate an MTC-PDCCH, an MTC-PDSCH and an MTC-PCFICH for MTC UE to a PDSCH region of a subframe excluding a legacy PDCCH section.

Here, MTC-PCFICH symbols may be hopped to different frequency resources in an MTC-PDCCH region to obtain a frequency diversity effect. Also, frequency hopping patterns of respective subframes or slots may differ from each other. MTC-PCFICH symbols may be allocated to the same frequency band without frequency hopping.

Specifically, when an MTC-PCFICH code including information about the number of OFDM symbols (time domain) or the number of RBs/subcarriers/groups (frequency domain) occupied by an MTC-PDCCH is given, the frame configuration unit 110 allocates an MTC-PCFICH using an MTC-PCFICH code obtained by cyclic-shifting the given MTC-PCFICH code according to a CFI that is information about the number of OFDM symbols occupied by the legacy PDCCH.

Also, using the explicit scheme, the frame configuration unit 110 may send CFI information bits for a legacy LTE station on a control channel (e.g., the MTC-PCFICH) for MTC UE determined in advance between the base station and MTC UE.

Here, to perform the explicit scheme, the frame configuration unit 110 may perform joint coding of CFI information for a legacy LTE station and CFI (MTC-CFI) information for MTC UE, and send the joint-coded CFI information on the control channel for MTC UE.

The communicator 120 transmits the subframe to which resources are allocated by the frame configuration unit 110 to the MTC UE.

Figure 10:
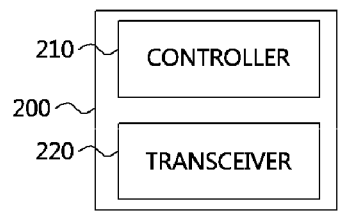
FIG. 10 is a block diagram showing the constitution of MTC UE for supporting MTC according to an example embodiment of the present invention.

FIG. 10 is a block diagram showing the constitution of MTC UE for supporting MTC according to an example embodiment of the present invention.

Referring to FIG. 10, MTC UE 200 for supporting MTC according to an example embodiment of the present invention may include a controller 210 and a transceiver 220.

The controller 210 receives a subframe of a downlink channel from a base station through the transceiver 220, and detects the number of OFDM symbols occupied by a legacy PDCCH from the received subframe.

Specifically, the controller 210 detects an MTC-PCFICH by performing blind decoding of the received subframe, and detects the number of OFDM symbols occupied by the legacy PDCCH using the detected MTC-PCFICH.

For example, when a position of the MTC-PCFICH is allocated to the last OFDM symbol of the subframe, the controller 210 detects an MTC-PCFICH by performing blind decoding of a cyclic shift.

Here, the MTC-PCFICH is assumed as being allocated using an MTC-PCFICH code that is obtained by cyclic-shifting a given predetermined MTC-PCFICH code on the basis of a CFI for a legacy LTE station.

In addition, the controller 210 may determine the number of OFDM symbols occupied by the legacy PDCCH on the basis of symbol positions of the detected MTC-PCFICH that are allocated differently in the frequency domain according to CFIs. For example, when it is determined that a CFI is 1 according to the positions of the MTC-PCFICH symbols, the controller 210 may determine that the number of OFDM symbols occupied by the legacy PDCCH is one.

Alternatively, when an MTC-PDCCH region and an MTC-PDSCH region are separated by FDM, the controller 210 detects an MTC-PCFICH by performing blind decoding of a cyclic shift.

Furthermore, the controller 210 may detect the number of OFDM symbols occupied by the legacy PDCCH on the basis of symbol positions of the detected MTC-PCFICH that are allocated differently in the time domain according to CFIs. For example, when it is determined that a CFI is 1 according to the positions of the MTC-PCFICH symbols, the controller 210 determines that the number of OFDM symbols occupied by the legacy PDCCH is one.

Alternatively, when the position of the MTC-PCFICH is allocated to an OFDM symbol next to the last OFDM symbol occupied by the PDCCH for the legacy LTE station, the controller 210 detects an MTC-PCFICH by performing blind decoding beginning with a specific OFDM symbol (e.g., a first OFDM symbol of the subframe).

Alternatively, when an MTC-PDCCH region and an MTC-PDSCH region are separated by TDM, the controller 210 detects an MTC-PCFICH by performing blind decoding beginning with the last symbol of the subframe.

Alternatively, the controller 210 demodulates and decodes a control channel for MTC UE allocated to a predetermined position in the subframe received from the base station, thereby extracting CFI information bits for the legacy station.

Here, the control channel for MTC UE is transmitted at a fixed position (OFDM symbol position) in the subframe regardless of the number of PDCCH symbols (CFI value) for the legacy LTE station. Thus, it is necessary only to demodulate and decode the control channel for MTC UE transmitted at the fixed position in the subframe, and the MTC UE may not perform blind decoding.

Moreover, the controller 210 determines the number of OFDM symbols occupied by the legacy PDCCH on the basis of the extracted CFI information bits for the legacy LTE station.

Here, using a CFI codeword table, the MTC UE may know the number of OFDM symbols occupied by the legacy PDCCH as well as the number of OFDM symbols occupied by an MTC-PDCCH.

The transceiver 220 may receive a downlink subframe from the base station and provide the received downlink subframe to the controller 210.

Figure 11:
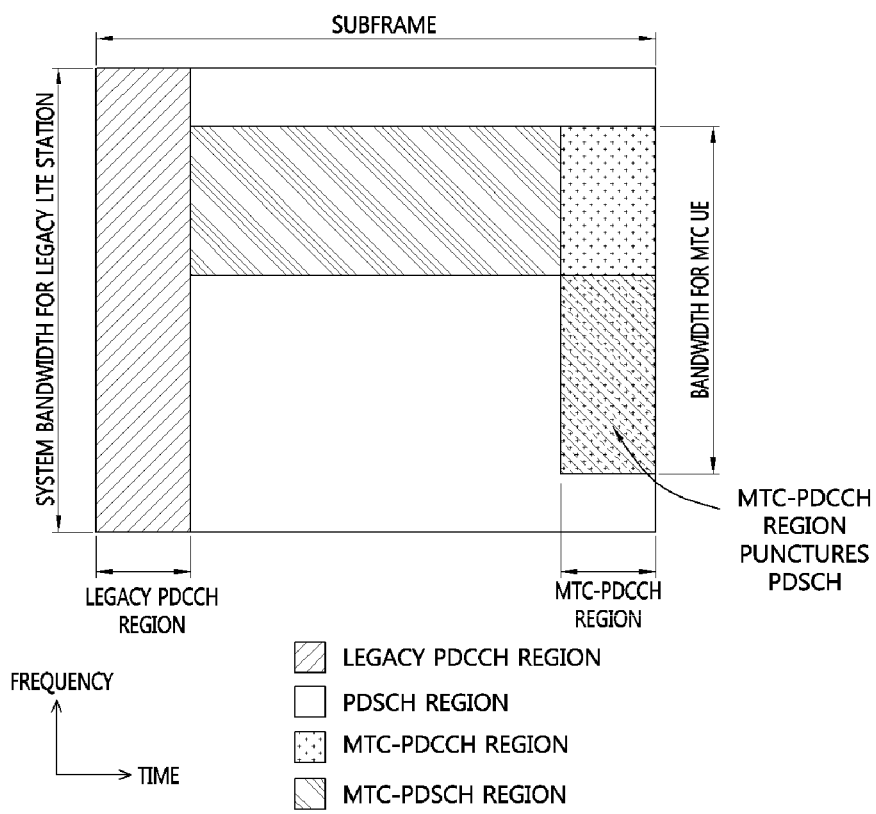
FIG. 11 illustrates a frame structure relating to a process for a case in which channel regions of MTC UE and a legacy Long Term Evolution (LTE) station overlap each other.

FIG. 11 illustrates a frame structure relating to a process for a case in which channel regions of MTC UE and a legacy LTE station overlap each other.

Referring to FIG. 11, when resources allocated to MTC UE do not use an entire MTC-PDSCH region, a base station may allocate a PDSCH for legacy LTE stations to a region to which no channel is allocated.

In other words, although an MTC-PDCCH region is distributed to all resources allocated for the MTC UE, the MTC UE may not use the entire MTC-PDSCH region, and thus resources that are not allocated to a data region of the MTC UE may be allocated to the PDSCH for the legacy LTE stations.

Also, when a legacy PDSCH region and the MTC-PDCCH region overlap each other, the base station punctures the legacy PDSCH.

Using the above-described MTC support method and apparatus according to example embodiments of the present invention, a base station allocates physical channels for MTC UE by cyclic-shifting a predetermined MTC-PCFICH code according to a CFI, and the MTC UE can detect the number of OFDM symbols occupied by a legacy PDCCH in an implicit scheme or an explicit scheme.

Consequently, it is possible to support efficient MTC service while maintaining compatibility with a legacy LTE station.

While the example embodiments of the present invention and their advantages have been described in detail, it should be understood that various changes, substitutions and alterations may be made herein without departing from the scope of the invention.

What is claimed is:

1. A machine type communication (MTC) support method performed in a base station, comprising:
    allocating physical channels of MTC user equipment (UE), including information about a number of orthogonal frequency division multiplexing (OFDM) symbols occupied by a physical downlink control channel (PDCCH) of a station, to a physical downlink shared channel (PDSCH) region between the base station and the MTC UE, to transmit data to the MTC UE; and transmitting, at the physical channels of the MTC UE, an allocated subframe, wherein the allocating the physical channels of the MTC UE includes cyclic-shifting a predetermined MTC-physical control format indicator channel (PCFICH) code according to a control format indicator (CFI) for the station, and allocating an MTC-PCFICH using the cyclic-shifted MTC-PCFICH code.

2. The MTC support method of claim 1, wherein the MTC-PCFICH code includes information about at least one of a number of OFDM symbols, a number of resource blocks (RBs), and a number of subcarriers occupied by an MTC-PDCCH.

3. The MTC support method of claim 1, wherein allocating the physical channels of the MTC UE includes performing joint coding of control format indicator (CFI) information about the station and CFI information about the MTC UE, including the joint-coded CFI information in a predetermined control channel of the MTC UE, and allocating the physical channels.

4. A base station, comprising:
a frame configuration unit configured to allocate physical channels of machine type communication (MTC) user equipment (UE) to a physical downlink shared channel (PDSCH) region between the base station and the MTC UE to transmit data to the MTC UE; and
a communicator configured to transmit a subframe to which the physical channels of the MTC UE are allocated,
wherein the frame configuration unit cyclic-shifts a predetermined MTC-physical control format indicator channel (PCFICH) code on the basis of a control format indicator (CFI) for the station, and allocates an MTC-PCFICH using the cyclic-shifted MTC-PCFICH code.

5. The base station of claim 4, wherein the frame configuration unit performs joint-coding of control format indicator (CFI) information about the station and CFI information about the MTC UE, includes the joint-coded CFI information in a predetermined control channel of the MTC UE, and allocates the physical channels.

6. A machine type communication (MTC) support method performed in MTC user equipment (UE), comprising:
receiving a subframe from a base station; and
detecting a region occupied by a physical downlink control channel (PDCCH) of a station from the received subframe,
wherein the detecting the region occupied by the PDCCH of the station from the received subframe includes detecting an MTC-physical control format indicator channel (PCFICH) by performing blind decoding of the received subframe, and detecting the region occupied by the PDCCH of the station using the detected MTC-PCFICH.

7. The MTC support method of claim 6, wherein detecting the MTC- PCFICH by performing blind decoding of the received subframe includes detecting the MTC-PCFICH by performing blind decoding of a cyclic shift of a control format indicator (CFI) for the station included in the received subframe.

8. The MTC support method of claim 7, wherein detecting the region occupied by the PDCCH of the station using the detected MTC-PCFICH includes detecting the region occupied by the PDCCH of the station according to a symbol position of the detected MTC-PCFICH allocated in a frequency domain differently according to the CFI.

9. The MTC support method of claim 7, wherein detecting the region occupied by the PDCCH of the station using the detected MTC-PCFICH includes detecting the region occupied by the PDCCH of the station according to a symbol position of the detected MTC-PCFICH allocated differently in a time domain according to the CFI.

10. The MTC support method of claim 6, wherein detecting the MTC- PCFICH by performing blind decoding of the received subframe includes detecting the MTC-PCFICH by performing blind decoding beginning with a specific orthogonal frequency division multiplexing (OFDM) symbol in the received subframe.

11. The MTC support method of claim 6, wherein detecting the MTC- PCFICH by performing blind decoding of the received subframe includes detecting the MTC-PCFICH by performing blind decoding beginning with a last symbol in the received subframe when an MTC-PDCCH region and an MTC-physical downlink shared channel (PDSCH) region are separated by time division multiplexing (TDM).

12. The MTC support method of claim 11, wherein detecting the region occupied by the PDCCH of the station using the detected MTC-PCFICH includes detecting a number of orthogonal frequency division multiplexing (OFDM) symbols occupied by the PDCCH of the station according to a symbol position of the MTC-PCFICH detected through blind decoding beginning with the last symbol in the received subframe.

13. The MTC support method of claim 6, wherein detecting the region occupied by the PDCCH of the station from the received subframe includes:
extracting control format indicator (CFI) information about the station by demodulating and decoding an MTC-physical control format indicator channel (PCFICH) allocated to a predetermined position in the subframe; and
detecting the region occupied by the PDCCH of the station using the extracted CFI information.

14. Machine type communication (MTC) user equipment (UE), comprising:
a transceiver configured to receive a subframe from a base station; and
a controller configured to detect a region occupied by a physical downlink control channel (PDCCH) of a station from the received subframe,
wherein the controller detects an MTC-physical control format indicator channel (PCFICH) by performing blind decoding of the received subframe, and detects the region occupied by the PDCCH of the station using the detected MTC-PCFICH.

15. The MTC UE of claim 14, wherein the controller detects the MTC- PCFICH by performing blind decoding of a cyclic shift of a control format indicator (CFI) for the station included in the received subframe.

16. The MTC UE of claim 14, wherein, when an MTC-PDCCH region and an MTC-physical downlink shared channel (PDSCH) region are separated by time division multiplexing (TDM), the controller detects the MTC-PCFICH by performing blind decoding beginning with a last symbol of the subframe.

* * * * *